July 8, 1958 C. E. PETERSON 2,842,743
FREQUENCY MODULATOR
Filed March 1, 1957
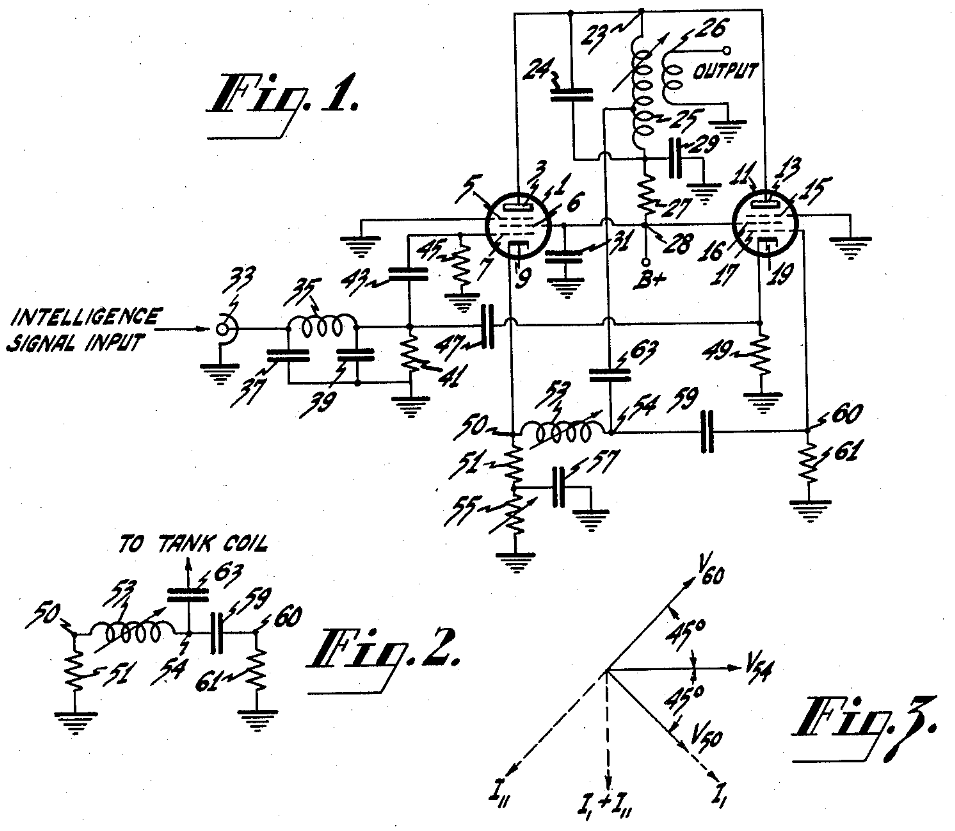
FIG. 1, FIG. 2, FIG. 3
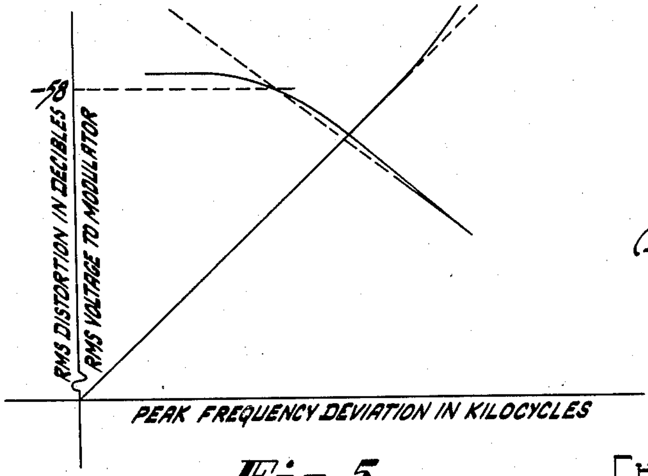
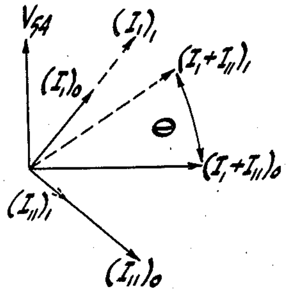
FIG. 4.
FIG. 5.
INVENTOR.
CHARLES E. PETERSON
BY
Charles H. Brown
ATTORNEY United States Patent Office 2,842,743

Patented July 8, 1958

2,842,743

FREQUENCY MODULATOR

Charles E. Peterson, Haddonfield, N. J., assignor, by mesne assignments, to the United States of America as represented by the Secretary of the Army Application March 1, 1957, Serial No. 643,296

12 Claims. (Cl. 332—23)

This invention relates to a frequency modulator, and particularly to a novel method of and means for providing frequency modulation in communication systems.

An object of the invention is to provide a frequency-modulated radio-frequency carrier of high linearity suitable for broadcast or multichannel radio-telephone applications.

Another object of the invention is to provide a frequency modulator of balanced circuitry which is not dependent upon a balanced intelligence signal source and therefore does not require an input transformer or a phase-inverter stage.

Briefly stated, the modulator of the invention comprises a Hartley type oscillator with the plates of two vacuum tubes connected in parallel to an oscillator tank circuit. The cathode of each tube is connected to the control grid of the other and to ground by inductance, capacitance and resistance components of selected values. An intelligence signal is applied to the grid of one tube and the cathode of the other tube. For a positive going intelligence signal the plate current of one tube will increase and the plate current of the other tube will decrease. The resultant vector sum of the two plate currents shifts in respect to its quiescent position. The shift in reactive current is applied to the tank circuit to cause a change in frequency proportional to the magnitude of the reactance shift, thus providing frequency modulation.

In the modulator of the invention oscillations are sustained by virtue of a phase-shift produced by a feedback circuit connected from a tap on the tank coil of the modulator to the cathode of the first tube and the control grid of the second tube. The feedback circuit is formed by a first coupling condenser connected at one end to the tap on the tank coil and at the other end to the junction of a variable inductance coil and a second coupling condenser serially connected between the cathode of the first tube and the control grid of the second tube. By selecting suitable values of resistance in the cathode circuit of the first tube and the control grid of the second tube, and also of the inductance and capacitance connecting the cathode of the first tube to the control grid of the second tube, the voltage on the cathode of the first tube and the voltage on the control grid of the second tube can be made to lag and lead the feedback voltage fed from the tank circuit by forty-five degrees. Ignoring transit time effects, the plate current of the first tube will be in phase with the voltage applied to the cathode. The plate current of the second tube will be 180 degrees out of phase with the voltage applied to the control grid of the second tube. The vector sum of the plate currents of the first and second tubes will lag the feedback voltage from the tank circuit by 90 degrees. To start oscillations in the tank circuit of the modulator the plate current of the first tube is adjusted by varying the feedback voltage applied to the cathode until the plate current is in phase with the plate voltage. The feedback voltage is varied by adjusting the variable inductance in the feedback circuit until the vector sum of the plate currents of the first and second tubes lags the feedback voltage by an amount which is in excess of 90 degrees and which is sufficient to compensate for circuit losses. Too great a phase angle is not desired since it is advantageous to keep the level of the oscillations low in order for the tubes to operate in the most linear portion of their operating characteristics.

A more detailed description of the invention follows in conjunction with a drawing, wherein:

Figure 1 is a circuit diagram of an embodiment of the invention.

Figure 2 is a simplified detail diagram of a portion of the circuit of Figure 1 showing the feedback circuit of the modulator-oscillator.

Figure 3 is a vector diagram illustrating the phase relationship between the feedback voltage, the voltage on the cathode of the first tube, the voltage on the control grid of the second tube and the vector sum of the plate currents.

Figure 4 is a vector diagram illustrating the phase shift of the vector sum of the plate currents of the modulator tubes for a positive going intelligence signal.

Figure 5 is a graph illustrating the distortion of the modulator in decibels plotted against peak frequency deviation.

Referring to Figure 1 in detail, there are shown first and second vacuum tubes 1 and 11 coupled together to provide a frequency modulator of balanced circuitry. The first vacuum tube 1 has a plate 3, a suppressor 5, a screen grid 6, a control grid 7 and a cathode 9. The second vacuum tube 11 has a plate 13, a suppressor grid 15, a screen grid 16, a control grid 17 and a cathode 19. The suppressor grids 5 and 15 of tubes 1 and 11 are connected to ground to maintain a minimum potential on the suppressor grids with respect to the cathodes 9 and 19, which provides more linear operating characteristics for the tubes. The screen grids 6 and 16 of tubes 1 and 11 respectively are connected to the positive terminal 28 of a unidirectional source of B+ voltage. Plate 3 of tube 1 is connected to plate 13 of tube 11 at terminal 23. A tank circuit, comprising a condenser 24 connected in parallel with a variable inductance coil 25, is connected in series with a current limiting resistor 27 between the B+ terminal 28 and terminal 23. Another inductance coil 26 is coupled to coil 25 and feeds the modulating signal to the device to be modulated.

A bypass condenser 29 is connected from the junction of resistor 27 and variable inductance coil 25 to ground. The purpose of condenser 29 is to isolate the B+ power supply of the modulator from video and radio frequency (R. F.) signals. Condenser 29 in combination with resistor 27 forms a low pass filter for video and R. F. signals and presents their entrance into the B+ power supply. Screen grid 6 of tube 1 and screen grid 16 of tube 11 are connected to B+ at terminal 28. A bypass condenser 31 is connected from screen grid 6 to ground. The purpose of condenser 31 is to further isolate the B+ power supply from video and R. F. signals picked up by screen grids 6 and 16.

Intelligence signals are applied to the frequency modulator at terminal jack 33. A low pass filter network is connected to terminal jack 33. The filter network comprises an inductance coil 35, a first bypass condenser 37 connected from the junction of one end of coil 35 and terminal jack 33 to ground, and a second bypass condenser 39 in parallel with a resistor 41 connected from the other end of coil 35 to ground. Condenser 39 also acts as a radio frequency (R. F.) bypass condenser to keep control grid 7 of tube 1 and cathode 19 of tube 11 at R. F. ground potential. A first coupling condenser 43 is connected from the junction of condenser 39 and inductance coil 35 to the control grid 7 of tube 1. A grid leak resistor 45 is connected from control grid 7 to ground. A second coupling condenser 47 is connected from the junction of condenser 39 and inductance coil 35 to the cathode 19 of tube 11. A current limiting resistor 49 is connected from the junction of condenser 47 and cathode 19 to ground.

The intelligence signals applied to terminal jack 33 are fed through the filter network to the control grid 7 of tube 1 and the cathode 19 of tube 11. The filter network provides a flat frequency response for the input to control grid 7 of tube 1 and cathode 19 of tube 11.

A variable inductance coil 53 is connected in series with a coupling condenser 59 between the cathode 9 of tube 1 and the control grid 17 of tube 11. A resistor 51 is connected at one end to the junction point 50 of cathode 9 and variable inductance coil 53 and at the other end to a variable resistor 55 which is connected to ground. By means of variable resistor 55 the plate current of tube 1 can be made equal to the plate current of tube 11. A bypass condenser 57 is connected from the junction of resistors 51 and 55 to ground. In combination with resistor 55, condenser 57 forms a low pass filter to remove video and R. F. signals from the cathode circuit of tube 1.

A grid bias resistor 61 is connected from the junction of condenser 59 and control grid 17 of tube 11. A coupling condenser 63 is connected from a tap on the tank coil 25 to the junction point 54 of the inductance coil 53 and the coupling condenser 59. Condenser 63 in combination with inductance coil 53 and condenser 59 constitutes a feedback circuit for feeding voltage from the tank circuit to the cathode 9 of tube 1 and the control grid 17 of tube 11.

Considering junction point 54 as a reference point, the voltage on the cathode 9 at junction point 50 can be made to lag the feedback voltage by an angle of 45 degrees and the voltage on the control grid 17 at junction point 60 can be made to lead the feedback voltage by an angle of 45 degrees. The amount of phase shift at junction point 50 can be varied by changing the values of variable inductance coil 53 and resistor 51. The amount of phase shift at junction point 60 can be varied by selecting suitable values of capacitance and resistance for condenser 59 and resistor 61.

Under normal conditions the plate current of tube 1 will be in phase with the voltage appearing on the cathode 9 and the plate current of tube 11 will be 180 degrees out of phase with the voltage appearing on control grid 17. The sum of the plate currents of tubes 1 and 11 lags the feedback voltage applied to junction point 54 by 90 degrees. In order to start oscillations in the tank circuit some current in phase with the plate voltage of the two tubes must be applied to the tank coil 25. Oscillations are started in the tank circuit by adjusting variable inductance coil 53 and tank coil 25 to values of inductance where the vector sum of the plate currents of tubes 1 and 11 lags the feedback voltage applied to junction point 54 by an amount in excess of 90°, which is sufficient to compensate for circuit losses.

For positive going intelligence signals applied to terminal jack 33 the plate current of tube 1 will increase and the plate current of tube 11 will decrease. The resultant vector sum of the plate currents of the two tubes will shift with respect to its quiescent position. The shift in reactive current applied to the tank circuit causes a change in frequency proportional to the reactance shift.

The circuit of Figure 1 was constructed and the parameters were adjusted for operation at a frequency of 50 megacycles. An intelligence signal having a frequency of 15 kilocycles was applied to terminal jack 33. The variable inductance 53 and the tank coil 25 were adjusted for minimum modulation distortion for various values of peak deviation from zero to ±600 kilocycles (k. c.). For peak frequency deviations of less than ±300 k. c. the root mean square (R. M. S.) distortion is at least −58 decibels as shown in Figure 5.

Figure 2 is a simplified detail diagram of a portion of the circuit of Figure 1 showing the feedback circuit of the modulator-oscillator. The combination of inductance coil 53 and resistance 51 provides a phase shift of the voltage at junction point 50 which lags the feedback voltage at junction point 54 by an angle of 45 degrees. The combination of capacitance 59 and resistance 61 provides a phase shift of the voltage at junction point 60 which leads the feedback voltage at junction point 54 by an angle of 45 degrees as shown in Figure 3.

Figure 3 is a vector diagram showing that the voltage at junction point 50 on cathode 9 of tube 1 lags the feedback voltage at junction point 54 by an angle of 45 degrees and the voltage at junction point 60 on control grid 17 of tube 11 leads the feedback voltage at junction point 54 by an angle of 45 degrees The plate current $I_{11}$ of tube 11 is 180 degrees out of phase with the voltage at junction point 60 on control grid 17 of tube 11. The vector sum of the plate currents $I_1$ and $I_{11}$ of the tubes 1 and 11 is 90 degrees out of phase with the feedback voltage at junction point 54.

Figure 4 is a vector diagram showing the quiescent position of the vector sum of the plate currents of tubes 1 and 11 $(I_1+I_{11})_0$ in relation to the feedback voltage at junction point 54 and the individual plate currents $(I_1)_0$ and $(I_{11})_0$. The increase in plate current $(I_1)_1$ of tube 1 and the decrease in plate current $(I_{11})_1$ of tube 11 due to the application of positive going intelligence signals to terminal jack 33 shown in Figure 1 is illustrated by dotted lines. The vector sum of the two plate currents $(I_1)_1$ and $(I_{11})_1$ is illustrated by the dotted line $(I_1+I_{11})_1$.

Figure 5 is a graph of the R. M. S. distortion of the modulator decibels plotted against peak frequency deviation. The graph illustrates the performance of the frequency modulator at 50 megacycles (M. C.) with an intelligence signal of 15 k. c. applied to terminal jack 33 as shown in Figure 1. The R. M. S. distortion is at least 58 decibels for peak frequency deviations of less than ±300 k. c.

The modulator of the invention provides greater economy in broadcast and radio telephone applications through the elimination of the input transformer or phase-inverter stage required by the conventional balanced frequency modulator to produce a shift in frequency output.

Having described the invention, what is claimed is:

1. A modulator comprising first and second vacuum tubes each having a cathode, a grid and a plate, a tuned circuit having a first variable inductance coil and a capacitor in parallel relationship, connections from the plates of said tubes to one end of said tuned circuit, a source of unidirectional potential, means for connecting the positive terminal of said source of unidirectional potential to the other end of said coil, a series connection of a second variable inductance coil and a capacitor coupled between the cathode of the first tube and the grid of the second tube, a connection from a tap on the coil of said tuned circuit to the junction between said second variable inductance coil and said last capacitor, individual resistors connecting the cathode of said first tube and the grid of said second tube to a point of reference potential, an input circuit, and means to couple said input circuit both to the grid of said first tube and the cathode of said second tube.

2. A modulator comprising first and second vacuum tubes each having a cathode, a grid and a plate, a tuned circuit having a first variable inductance coil and a capacitor in parallel relationship, connections from the plates of said tubes to one end of said tuned circuit, a source of unidirectional potential, means for connecting the positive terminal of said source of unidirectional potential to the other end of said coil, a series connection of a variable reactance of one sign and a reactance of another sign coupled between the cathode of said first tube and the grid of said second tube, a connection from a point on the coil of said tuned circuit to the junction between said last two reactances, individual resistors connecting the cathode of said first tube and the grid of said second tube to a point of reference potential, an input circuit, and means to couple said input circuit both to the grid of said first tube and the cathode of said second tube.

3. A frequency modulator comprising, in combination, an oscillator tank circuit, a source of unidirectional voltage, a first and a second vacuum tube, each of said vacuum tubes having a plate, a suppressor grid, a screen grid, a control grid and a cathode, means for connecting the plate of said first tube and the plate of said second tube to said tank circuit, means for maintaining the suppressor grids of said first and second tubes at a minimum voltage level with respect to the cathodes, means for connecting said tank circuit to the positive terminal of said source of voltage, means for connecting the screen grids of said first and second tubes to said positive terminal, a source of intelligence signals, means for coupling said source of intelligence signals to the control grid of said first tube and the cathode of said second tube, means for feeding voltage from said tank circuit to the cathode of said first tube through a reactance of one sign and to the control grid of said second tube through a reactance of an opposite sign whereby oscillations are produced in said tank circuit which vary in frequency in accordance with said intelligence signals, and means for deriving output signals from said tank circuit.

4. A frequency modulator as claimed in claim 3, said means for maintaining the suppressor grids of said first and second tubes at a minimum voltage level with respect to the cathodes comprising connections to a point of reference potential.

5. A frequency modulator comprising in combination, a source of unidirectional voltage, a first and second vacuum tube, said tank circuit having a first capacitor connected in parallel with a first variable inductance coil, said first and second tubes each having a plate, a suppressor grid, a screen grid, a control grid and a cathode, connections from the plates of said tubes to one end of said tank circuit, connections from said suppressor grids to a point of reference potential, current limiting means connecting the other end of said coil to the positive terminal of said voltage source, means for connecting the screen grids of said first and second tubes to the positive terminal of said voltage source, a series connection of a second variable inductance coil and a second capacitor coupled between the cathode of the first tube and the control grid of the second tube, a connection from a tap on said first coil to the junction of said second coil and said second capacitor, individual resistors connecting the cathode of said first tube and the control grid of said second tube to said point of reference potential, an input circuit, and means to couple said input circuit both to the grid of said first tube and the cathode of said second tube.

6. A frequency modulator as claimed in claim 5, said current limiting means comprising a current limiting resistor.

7. A frequency modulator comprising in combination, an oscillator tank circuit, a source of unidirectional volttage, a first and a second vacuum tube, said tank circuit having a first capacitor connected in parallel with a first variable inductance coil, said first and second tubes each having a plate, a suppressor grid, a screen grid, a control grid and a cathode, connections from one end of said first coil to the plates of said first and second tubes, a first resistor connected from the positive terminal of said voltage source to the other end of said coil, connections from said suppressor grids to a point of reference potential, connections from said screen grids to the positive terminal of said voltage source, a series connection of a second variable inductance coil and a second capacitor coupled between the cathode of the first tube and the control grid of the second tube, a connection from a tap on said first coil to the junction of said second coil and said second capacitor, individual resistors connecting the cathode of said first tube and the control grid of said second tube to said point of reference potential, an input circuit, and means to couple said input circuit both to the grid of said first tube and the cathode of said second tube.

8. A frequency modulator as claimed in claim 7, said input circuit comprising a flat frequency response filter.

9. A frequency modulator comprising in combination, an oscillator tank circuit, a source of unidirectional voltage, first and second vacuum tubes each having a cathode, a control grid, a screen grid, a suppressor grid and a plate, an oscillator tank circuit having a first capacitor connected in parallel with a first variable inductance coil, connections from one end of said first coil to the plates of said first and second tubes, a first resistor connected from the positive terminal of said voltage source to the other end of said coil, connections from said suppressor grids to a point of reference potential, connections from said screen grids to the positive terminal of said voltage source, a series connection of a second variable inductance coil and a second capacitor coupled between the cathode of said first tube and the control grid of said second tube, a third capacitor connected from a tap on said first coil to the junction of said second coil and said second capacitor, a series connection of a second resistor and a third variable resistor coupled between the cathode of said first tube and said point of reference potential, a fourth resistor coupled between the control grid of said second tube and said point of reference potential, an input filter circuit, and means to couple said input filter circuit both to the grid of said first tube and the cathode of said second tube.

10. A frequency modulator as claimed in claim 9, said means to couple said input filter circuit both to the grid of said first tube and the cathode of said second tube comprising a first coupling condenser connected from the output of said filter to the grid of said first tube and a second coupling condenser connected from the output of said filter to the cathode of said second tube.

11. A frequency modulator comprising in combination, an oscillator tank circuit, a source of unidirectional voltage, first and second vacuum tubes each having a cathode, a control grid, a screen grid, a suppressor grid and a plate, an oscillator tank circuit having a first capacitor connected in parallel with a first variable inductance coil, connections from one end of said first coil to the plates of said first and second tubes, a first resistor connected from the positive terminal of said voltage source to the other end of said coil, connections from said suppressor grids to a point of reference potential, connections from said screen grids to the positive terminal of said voltage source, a series connection of a second variable inductance coil and a second capacitor coupled between the cathode of said first tube and the control grid of said second tube, a third capacitor connected from a tap on said first coil to the junction of said second coil and said second capacitor, a series connection of a second resistor and a third variable resistor coupled between the cathode of said first tube and said point of reference potential, a fourth resistor coupled between the control grid of said second tube and said point of reference potential, a first bypass condenser connected from said screen grids to said point of reference potential, a second bypass condenser connected from the junction of said second and third resistors to said point of reference potential, said third capacitor feeding a voltage from said tank circuit to the cathode of said first tube through said second coil and to the control grid of said second tube through said second capacitor whereby oscillations are produced in said tank circuit which vary in frequency in accordance with said intelligence signals, and means for deriving output signals from said tank circuit.

12. A frequency modulator as claimed in claim 11, said means for deriving output signals from said tank circuit comprising a third coil coupled to said first coil in said tank circuit.

References Cited in the file of this patent

UNITED STATES PATENTS

| | | |
|---|---|---|
| 2,339,608 | Alvira | Jan. 18, 1944 |
| 2,394,393 | Mayer | Feb. 5, 1946 |